Figure 1:
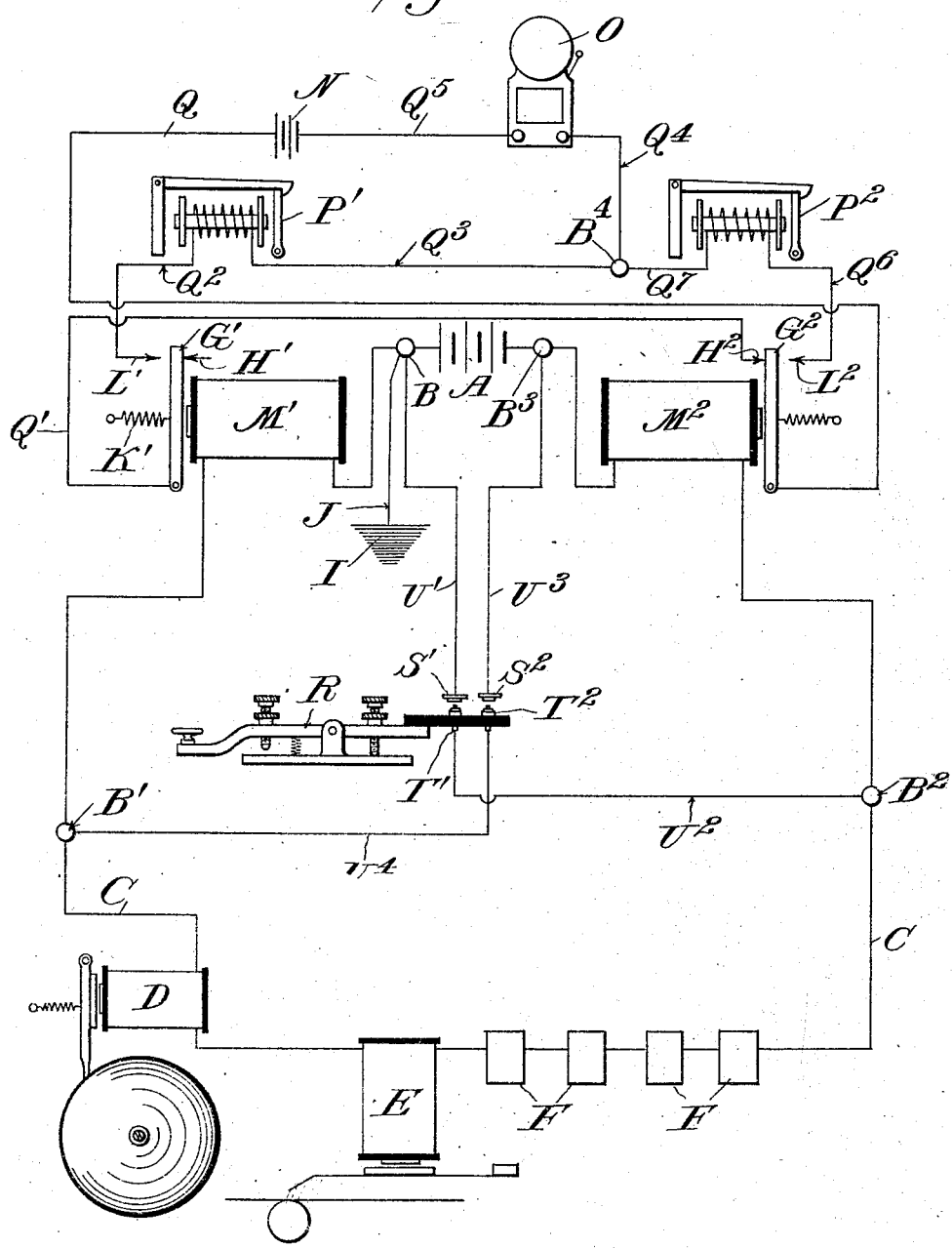

C. E. BEACH.
SIGNALING SYSTEM.
APPLICATION FILED SEPT. 23, 1910.

1,062,381.

Patented May 20, 1913.
2 SHEETS—SHEET 1.

WITNESSES:

INVENTOR
Clarence E. Beach

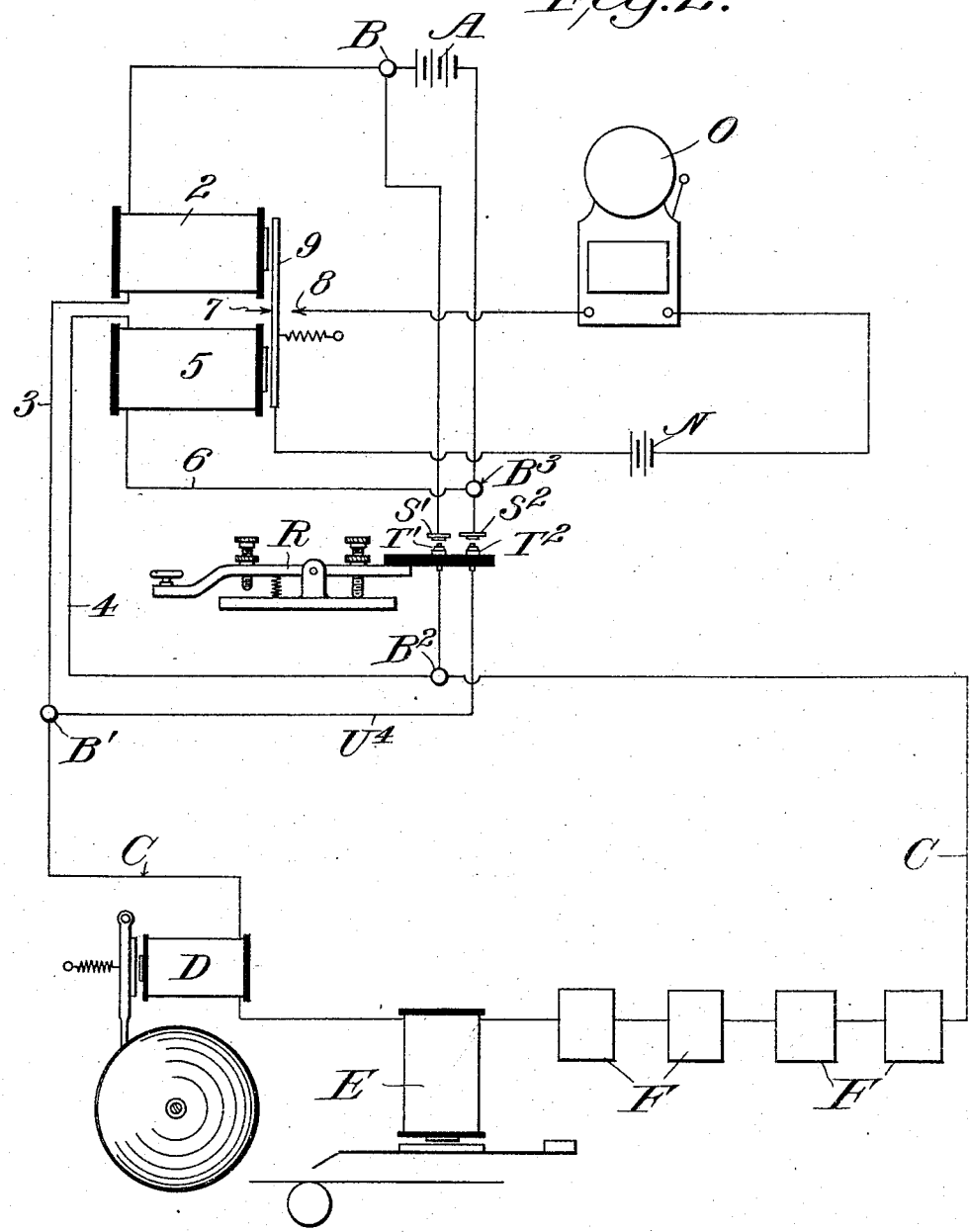

UNITED STATES PATENT OFFICE.

CLARENCE E. BEACH, OF BINGHAMTON, NEW YORK, ASSIGNOR TO GEORGE O. KNAPP, OF NEW YORK, N. Y.

SIGNALING SYSTEM.

1,062,381.  Specification of Letters Patent.  Patented May 20, 1913.

Application filed September 23, 1910. Serial No. 583,463.

*To all whom it may concern:*

Be it known that I, CLARENCE E. BEACH, a citizen of the United States, residing at Binghamton, in the county of Broome and State of New York, have invented certain new and useful Improvements in Signaling Systems, of which the following is a specification.

This invention relates to signaling circuits, and is especially adaptable to signal circuits having signal receiving devices located at a plurality of points and having signal transmitting devices located at a central station, and the object is to provide improved means and arrangements for indicating defects at the transmitting station and without causing such defects to influence the receiving stations or to be indicated, sounded or otherwise manifested at the receiving stations.

In systems of this class as heretofore arranged, breaks in the circuit or grounding thereof will be manifested at the receiving or recording instruments on the circuit, and confusion and disturbance would result. For example, in fire alarm systems there would be confusion at the fire engine houses or other points where signal recording and indicating devices will be located.

The object of my invention is, therefore, to so arrange the systems as to eliminate such confusion and disturbance at the receiving stations, yet to clearly and reliably indicate at the transmitting station the circuit defects which cause such confusion and disturbance. This I accomplish by novel circuit arrangement and circuit controlling apparatus. In my arrangement the circuit, including the circuit receiving and recording devices, is normally permanently closed through high resistance paths at the central station, so that the electro-magnetic actuating parts of the signal receiving and recording devices will normally receive insufficient current flow and will not operatively affect their recording or signaling mechanism. The circuit can therefore become defective by being grounded or open or otherwise influenced without causing any change in the operative condition of the signal receiving or recording devices, and there will be no confusion or disturbance. In the resistance paths at the central station I include electro-magnetic devices which are responsive to the normal low current flow through the circuit to control various circuits including indicating apparatus. The defects on the circuits, although not causing any disturbance at the signal recording or receiving apparatus, will affect the electro-magnetic mechanisms and consequent adjustment of the indicating circuits to cause indication at the central station of the defects. At the central station I also provide signal controlling mechanism adapted when connected with the circuit to change the current conditions in the circuit to cause operative response of the signal receiving and recording apparatus.

In the drawings—Figure 1 is a diagrammatic illustration of one form of circuit; and Fig. 2 is a diagrammatic illustration of a modified form of circuit.

In Fig. 1, A is the main battery from which current normally flows through binding post B, relay magnet $M^1$ to binding post $B^1$, thence through circuit C to bell magnet D, register magnet E and other signal indicating or recording devices, F, F, F, F, to binding post $B^2$, thence through relay magnet $M^2$ to binding post $B^3$ and other side of battery.

The winding of the magnets $M^1$ and $M^2$ is such that they will be sufficiently energized to draw their respective armatures $G^1$ and $G^2$ against stops $H^1$ and $H^2$, even though the current passing through them is insufficient to cause the magnets D and E and the magnets provided in the devices F, F, F, F, to actuate their respective armatures, the resistance of said magnets $M^1$ and $M^2$ being such that the volume of current which the battery A can send through said magnets and the path already described will not be sufficient to attract or cause to be attracted or retained the armatures of the signal recording or indicating devices connected with the circuit C.

The resistance of the foregoing current path between the binding posts B and $B^1$, $B^2$ and $B^3$, respectively, may, of course, be made up partly of the resistance of the magnets $M^1$ and $M^2$, and partly of a resistance coil placed in series therewith. A connection is established between the binding post B and the earth I by means of the wire J. It will thus be seen that in the event of any portion of the circuit C becoming grounded, a current path will be established from the binding post $B^2$ to the binding post B in parallel with the path which includes the magnet $M^1$, thus demagnetizing said magnet $M^1$ so that its armature $G^1$ will be retracted by means of the tension spring $K^1$ until said armature makes contact with the stop $L^1$. Any ordinary signaling or indicating mechanism may be controlled by this armature $G^1$. That shown in Fig. 1 comprises the local battery N, bell O and annunciator drop $P^1$.

From one side of the battery N, the current passes through wire Q to the pivot of armature $G^2$ and the pivot of armature $G^1$ is connected by means of wire $Q^1$ to the stop $H^2$. It is, therefore, evident that the annunciator drop $P^1$ will not be affected by the retraction of the armature $G^1$ unless the armature $G^2$ is, at the time, in contact with the stop $H^2$.

The wire $Q^2$ connects the stop $L^1$ with one end of the magnet provided in annunciator drop $P^1$, the other end of said magnet being connected by means of the wire $Q^3$ to the binding posts $P^4$. From the binding post $B^4$, a path is provided through wire $Q^4$ to bell O, thence through wire $Q^5$ to the other side of the battery N. It will thus be seen that if the magnet $M^2$ is so energized as to hold its armature $G^2$ against the stop $H^2$ and the magnet $M^1$ is demagnetized, the armature $G^1$ will fall against the stop $L^1$ and thus provide a path for the current from the battery N through wire Q, armature $G^2$, stop $H^2$, wire $Q^1$, armature $G^1$, stop $L^1$, wire $Q^2$, annunciator drop $P^1$, wire $Q^3$, binding post $B^4$, wire $Q^4$, bell O and wire $Q^5$, back to the other side of battery N, thus causing the annunciator drop $P^1$ to give a visible indication and the bell O to give audible notice that some portion of the circuit C has been grounded.

In case the main line circuit through the path already described should be interrupted or the main battery A should fail, the current through magnets $M^1$ and $M^2$ will be interrupted and the armatures $G^1$ and $G^2$ will be retracted so as to rest upon the stops $L^1$ and $L^2$ respectively. The path of current from the local battery N would now be through wire Q to armature $G^2$, thence through stop $L^2$, wire $Q^6$, magnet of annunciator drop $P^2$ and wire $Q^7$ to binding post $B^4$, thence through wire $Q^4$, bell O and wire $Q^5$ to the other side of battery N. It will thus be seen that whenever the current flow in such main circuit is interrupted, the fact will be visibly indicated by annunciator drop $P^2$ and audibly announced by bell O, but the annunciator drop $P^1$ will not be affected.

For the purpose of transmitting a signal to the devices included in circuit C, a connection is established between binding posts B and $B^2$ and binding posts $B^3$ and $B^1$ respectively, a signaling device, here shown as a key R, being provided with the stationary contacts $S^1$ and $S^2$ and the movable contacts $T^1$ and $T^2$, so arranged that said movable contacts may be brought against the respective stationary contacts when the handle of the key is depressed. Contact $S^1$ is connected with binding post B by the wire $U^1$ and contact $T^1$ is connected with the binding post $B^2$ by the wire $U^2$. Binding post $B^3$ is connected with contact $S^2$ by the wire $U^3$ and contact $T^2$ is connected with the binding post $B^1$ by the wire $U^4$.

A separate main battery may be substituted for the battery A, the wires $U^1$ and $U^3$ being in that event connected to the corresponding terminals of such separate battery.

It will now be seen that if the handle of the key R is depressed, the current may flow from the binding post B through the wire $U^1$, contacts $S^1$ and $T^1$ and wire $U^2$ to the binding post $B^2$, and from thence such current will divide, a small part returning through the magnet $M^2$ to the binding post $B^3$ and the other side of battery A, but the principal portion of said current flowing through circuit C signal recording and indicating devices F, F, F, F, register magnet E and bell magnet D to binding post $B^1$, thence through wire $U^4$, contacts $T^2$ and $S^2$ and wire $U^3$ to binding post $B^3$. There will also be a path from binding post B through relay magnet $M^1$ to binding post $B^1$, through which a slight current will pass and return through wire $U^4$, contacts $T^2$ and $S^2$ and wire $U^3$ to binding post $B^3$.

It will be seen from the foregoing that the action of the signal key R will only vary the current in the magnets $M^1$ and $M^2$, but not at any time interrupt or reverse the direction of said current through these magnets, and signals can, therefore, be transmitted by operating the key R without causing the armatures $G^1$ or $G^2$ to vibrate and, therefore, without affecting the annunciator drops $P^1$ or $P^2$ or the bell O. It will also be noted that the test current normally flowing through the circuit C is in the opposite direction from the signaling current which flows through said circuit, while the key R is depressed, which fact has a very beneficial effect in that it tends to overcome and neutralize any residual magnetism in the magnets D and E and of the devices F, F, F, F. In practice, this results in much more accurate operation of all signal sounding and recording instruments used in fire alarm service.

The signal key R is merely shown to indicate the manner in which the battery should be connected to the line circuit for transmitting a signal, but this key forms no part of the present invention and any signal key, mechanical transmitter or other device, which will cause the battery to be connected to the line circuit in the same manner, may be substituted for the key construction shown.

Fig. 2 shows a similar equipment, using a pair of magnets having a common armature, one of the magnet spools 2 being normally in one leg of the line and the other magnet spool 5 being normally in the other leg of the line, and my improved test current scheme being applied to the circuit in a manner similar to that shown in Fig. 1.

In the normal operation of the system current flows from terminal B of the battery A through the magnet spool 2, wire 3, binding post B$^1$ to the circuit C in which may be included, as in the arrangement shown in Fig. 1, a bell magnet D, a register magnet E, and other signal indicating or recording devices F, F, F, F, thence from the other side of the circuit to the binding post B$^2$, through wire 4 to the magnet spool 5, through wire 6 to binding post B$^3$ and the other side of the battery. This current, owing to the relatively high resistance of the spools 2 and 5, is comparatively small but is sufficient to hold the armature 9 against its stop 7. In case of any disturbance to the main line, the current ceases to flow or is diminished through the magnet spools 2 and 5, the armature 9 is retracted and closes through the stop 8 the local circuit including the battery N and a bell O.

The signaling device R, here shown as a transmitting key, is provided with the movable contacts T$^1$, T$^2$, and the fixed contacts S$^1$, S$^2$, this signaling device being so arranged in the circuit that the flow of current is in the direction opposite to that of the normal or test current flow.

A very important advantage is obtained through the use of the above-described arrangement in that an accidental interruption of the circuit will not cause the signal recording and indicating devices to act, thus avoiding confusion and disturbance at fire-engine houses or other points where signal-recording and indicating devices are located in the event of the momentary breaking and closing of the circuit one or more times, while at the same time such breaking and closing will affect the magnets M$^1$ and M$^2$ (Fig. 1) or 2, 5 (Fig. 2), thus indicating a disturbance to the circuit at the central office.

I claim:—

1. A signaling system comprising a circuit having signal transmitting and receiving devices therein and a battery, one terminal of which is grounded, a normally energized relay connected to said grounded end of the battery and to one side of the signal circuit, a local battery circuit controlled by said relay and containing a signaling device, a second normally energized relay connected to the other terminal of the battery and to the other side of the signal circuit and having its armature included in the local circuit, a second signaling device and means for including it in circuit with the local battery when the second relay is de-energized.

2. A signaling system comprising a circuit having signal transmitting and receiving devices therein and a battery, one terminal of which is grounded, relays connected to opposite sides of said battery and signal circuit, a local battery circuit including the armature of both relays and a signaling device, and a branch local circuit including a signaling device controlled only by the relay connected to the nongrounded end of the battery.

3. A signaling system comprising a circuit having signal transmitting and receiving devices therein and a battery, one terminal of which is grounded, relays connected to opposite sides of said battery and signal circuit, a local battery circuit including the armature of both relays and a signaling device, and a branch local circuit including a signaling device controlled only by the relay connected to the non-grounded end of the battery, said signal transmitting device being connected to transmit current in a direction opposite to that of the normal current flow.

4. A signaling system comprising a circuit having a battery therein and having signal-receiving devices and magnetic-controlling means having coils connected on each side of the battery and on each side of the signal circuit, a local battery circuit containing a signaling device and controlled by such magnetic-controlling means, and a signal-transmitting device adapted to connect the said signal-receiving devices directly to the said battery.

5. A signaling system comprising a normally closed circuit having signal transmitting and receiving devices therein and a battery, magnetic controlling means having coils connected on each side of the battery and on each side of the signal circuit, and a local battery circuit containing a signaling device and controlled by such magnetic controlling means, said signal transmitting device being connected to transmit current in a direction opposite to that of the normal current flow.

6. A signaling system comprising a normally closed circuit having a source of current therein and signal receiving devices, means normally included in said circuit between the source of current and said signal receiving devices for restricting the current flow therethrough to be less than the current flow required for normal operation of the receiving devices, and circuit controlling means adapted to be associated with said circuit to increase the current flow through said receiving devices to cause normal operation thereof.

7. A signaling system comprising a normally closed circuit having a source of current therein and signal receiving devices, means normally included in said circuit between the source of current and the signal receiving devices for restricting the current flow therethrough to be less than the current flow required for normal operation of the receiving devices, and circuit-controlling means adapted to connect said signal receiving devices directly to the said current source.

8. A signaling system comprising a permanently closed circuit having a battery therein and electro-magnetic receiving devices, means normally included in said circuit between said battery and said receiving devices for restricting the current flow therethrough to be less than the current flow required for normal operation of the receiving devices, and a signal transmitting key adapted to connect said signal receiving devices directly to the battery.

9. A signaling system comprising a closed circuit containing a source of current and electro-magnetic receiving devices, electro-magnets having windings permanently included in said circuit between said source of current and said receiving devices, the resistance of said circuit being normally such that the current flow therethrough will be insufficient to cause normal operation of the receiving device but sufficient to cause energization of said electro-magnets, circuits controlled by said electro-magnets and including indicating mechanism, and signal transmitting mechanism adapted to connect said receiving devices directly to said source of current.

10. In a signaling system, electro-magnetic receiving devices, a source of current, electro-magnets, a circuit normally serially including said receiving devices, electro-magnets in said source of current, said electro-magnets being of high resistance so that the current flow is normally insufficient to allow effective operation of the receiving devices, signaling circuits controlled by said electro-magnets, and signal transmitting mechanism adapted to be connected in parallel relation to said electro-magnets to allow sufficient current flow for effective operation of the receiving devices.

11. A signaling system comprising a circuit having signal transmitting and receiving devices therein and a battery, a resistance normally in series with the signal receiving devices, and means operated by the signal transmitting device for connecting the battery to the signal receiving devices in parallel to said resistance.

12. A signaling system comprising a circuit having signal transmitting and receiving devices therein and a battery, magnetic controlling means having coils connected on each side of the battery and on each side of the signal circuit and means operated by the signal transmitting device for connecting the battery to the signal receiving devices in parallel to said magnetic controlling means.

13. A signaling system comprising a circuit having signal transmitting and receiving devices therein and a battery, a resistance normally included in said circuit between each side of the battery and the signal receiving devices, and means operated by the signal transmitting device whereby said batteries may be connected to the signal receiving devices in parallel with said resistances.

14. A signaling circuit having signal receiving devices therein, a battery normally connected to said signaling circuit through resistances connected to each pole of said battery, shunt circuits around said resistances whereby the battery may be directly applied to the signaling circuit, and a signal transmitting device controlling said shunt circuits.

15. A signaling circuit, signal receiving devices connected therein, a battery for said signaling circuit, two current paths from each pole of said battery to said signaling circuit, one of which current paths includes a resistance and connects with one terminal of the signaling circuit and the other of which current paths is controlled by a signal transmitting device and connects with the other terminal of the signaling circuit.

16. A signaling circuit, signal receiving devices connected therein, a battery for said signaling circuit, two current paths from each pole of said battery to said signaling circuit, one of which current paths is closed and includes a resistance and connects with one terminal of the signaling circuit and the other of which current paths is controlled by a signal transmitting device and connects with the other terminal of the signaling circuit, said resistance being sufficient to prevent operation of the signal receiving devices.

17. A signaling circuit, signal receiving devices connected therein, a battery for said signaling circuit, two current paths from each pole of said battery to said signaling circuit, one of which current paths includes magnetic controlling means and connects with one terminal of the signaling circuit and the other of which current paths is controlled by a signal transmitting device and connects with the other terminal of the signaling circuit.

18. A signaling circuit, signal receiving devices connected therein, a battery for said signaling circuit, two current paths from each pole of said battery to said signaling circuit, one of which current paths is closed and includes a magnetic control and connects with one terminal of the signaling circuit and the other of which current paths is controlled by a signal transmitting device and connects with the other terminal of the signaling circuit, said magnetic controlling means having a resistance sufficient to prevent operation of the signal receiving devices.

19. A signaling circuit, signal receiving devices connected therein, a battery for said signaling circuit, two current paths from each pole of said battery to said signaling circuit, one of which current paths includes a relay and connects with one terminal of the signaling circuit and the other of which current paths is controlled by a signal transmitting device and connects with the other terminal of the signaling circuit, said relays controlling local circuits including signaling devices.

20. A signaling circuit, signal receiving devices connected therein, a battery for said signaling circuit, two current paths from each pole of said battery to said signaling circuit, one of which current paths includes a relay and connects with one terminal of the signaling circuit and the other of which current paths is controlled by a signal transmitting device and connects with the other terminal of the signaling circuit, said relays controlling local circuits including signaling devices, and having a resistance sufficient to prevent operation of said signal receiving devices.

21. The combination in a signaling circuit of a battery, signal receiving devices, and a signal transmitting device arranged to send signals in one direction, with means including magnetic controlling devices for causing to flow through said signal receiving devices in an opposite direction a constant current of insufficient strength to operate said signal receiving devices.

22. A signaling system comprising a source of current and signal receiving devices, resistances serially connected between each terminal of said current source and said signal receiving devices, signal transmitting means, and cross connections for the said resistances controlled by said signal transmitting means whereby the battery terminal of each resistance may be connected to the line terminal and the other resistance.

23. A signaling system comprising a source of current and signal receiving devices, resistances serially connected between each terminal of said current source and said signal receiving devices, cross connections for the said resistances controlled by said signal transmitting means, said signal transmitting means arranged to simultaneously open and close said cross connections whereby the battery terminal of each resistance may be connected to the line terminal and the other resistance.

24. A signaling system comprising a source of current and signal receiving devices, resistances serially connected between each terminal of said current source and said signal receiving devices, electromagnets comprising or forming part of one or both of the resistances, signal transmitting means, and cross connections for the said resistance circuits controlled by said signal transmitting means whereby the battery terminal of each resistance circuit may be connected to the line terminal and the other resistance circuit.

25. A signaling system comprising a source of current and signal receiving devices, resistances comprising magnetic controlling means serially connected between each terminal of said current source and said signal receiving devices, signal transmitting means and cross connections for the said resistance circuits controlled by said signal transmitting means whereby the battery terminal of each resistance circuit may be connected to the line terminal and the other resistance circuit.

26. A signaling system comprising a source of current and signal receiving devices, resistances comprising magnetic controlling means serially connected between each terminal of said current source and said signal receiving devices, signal transmitting means and cross connections for the said resistance circuits controlled by said signal transmitting means whereby the battery terminal of each resistance circuit may be connected to the line terminal and the other resistance circuit, and a local battery circuit containing a signal device controlled by the magnetic controlling means.

In testimony whereof, I affix my signature in presence of two witnesses.

CLARENCE E. BEACH.

Witnesses:
C. M. CONNERTON,
M. L. THOMAS.

Copies of this patent may be obtained for five cents each, by addressing the "Commissioner of Patents, Washington, D. C."